United States Patent [19]
Coogan

[11] Patent Number: 5,735,564
[45] Date of Patent: Apr. 7, 1998

[54] LUGGAGE SAFETY BARRIER

[75] Inventor: James Deane Coogan, Camden Park, Australia

[73] Assignee: Rees Operations Pty. Ltd., Australia

[21] Appl. No.: 687,419

[22] PCT Filed: Aug. 31, 1995

[86] PCT No.: PCT/AU95/00562

§ 371 Date: Aug. 2, 1996

§ 102(e) Date: Aug. 2, 1996

[87] PCT Pub. No.: WO96/06756

PCT Pub. Date: Mar. 7, 1996

[30] Foreign Application Priority Data

Aug. 31, 1994 [AU] Australia ............... PM 7837

[51] Int. Cl.6 ........................................... B62D 33/04
[52] U.S. Cl. ........................................... 296/24.1; 780/748
[58] Field of Search ................... 296/24.1, DIG. 1; 280/748; 410/129, 142

[56] References Cited

U.S. PATENT DOCUMENTS

| | | |
|---|---|---|
| D. 215,051 | 8/1969 | Feth. |
| D. 288,553 | 3/1987 | Diener. |
| 3,632,155 | 1/1972 | Parker ............ 296/24.1 |
| 3,931,994 | 1/1976 | Palmiter. |
| 4,035,014 | 7/1977 | Sellers. |
| 4,621,856 | 11/1986 | McKenzie ......... 296/24.1 |
| 4,919,467 | 4/1990 | Guimelli ......... 296/24.1 |

FOREIGN PATENT DOCUMENTS

| | | |
|---|---|---|
| 6148080 | 2/1982 | Australia. |
| 7579487 | 1/1988 | Australia. |
| 5499094 | 8/1994 | Australia. |
| 6594094 | 1/1995 | Australia. |
| 2293337 | 7/1976 | France. |
| 4239471 | 5/1994 | Germany. |
| 2250485 | 6/1992 | United Kingdom. |
| 2261856 | 6/1993 | United Kingdom. |
| 2276593 A | 10/1994 | United Kingdom ......... 280/748 |

*Primary Examiner*—Gary C. Hoge
*Attorney, Agent, or Firm*—Brown, Martin, Haller & McClain, LLP

[57] ABSTRACT

A safety screen or barrier (10) for the protection of occupants within the vehicle against unrestrained forwardly moving loads within the vehicle in a situation where the vehicle suddenly decelerates. The screen assembly (10) comprise a thermoformed panel (11) of tough impact resistant polycarbonate material which, when mounted within the vehicle extends transversely from side to side and from top to bottom of the vehicle, the panel (11) being capable of deforming by eversion when load impacts thereagainst. The panel (11) has a rearwardly directed peripheral flange (17) and a forwardly bowed or arched profile in vertical section. Deformable pockets in the lower region of the panel (11) assist in cushioning the impact of the moving load against the panel. Devices (12) releasably anchor upper corners of the panel (11) to the vehicle roof, while devices (13) releasably engage bottom corner portions to the floor of the vehicle.

25 Claims, 7 Drawing Sheets

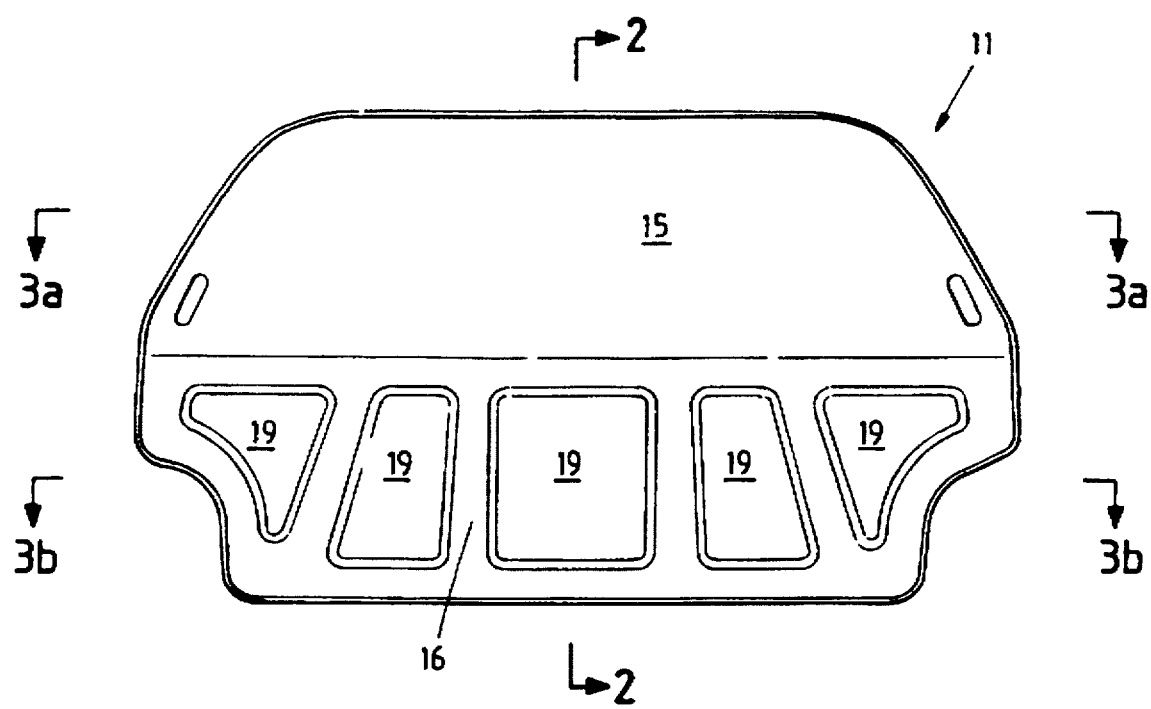
FIG 1b
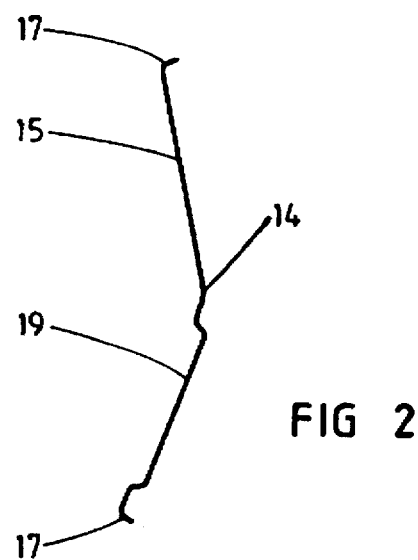
FIG 2
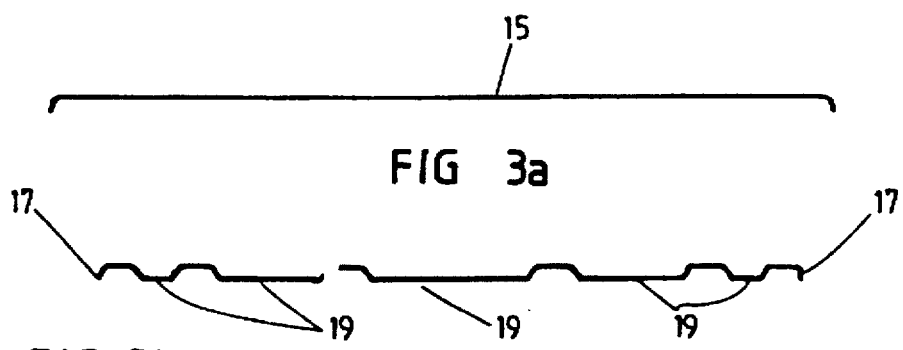
FIG 3a
FIG 3b

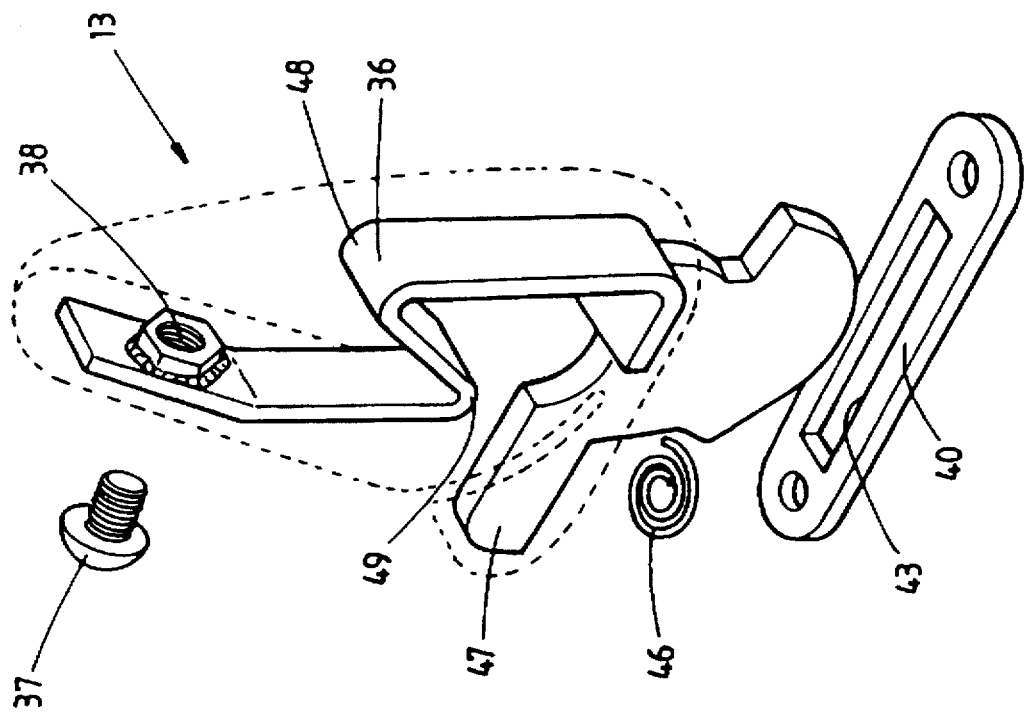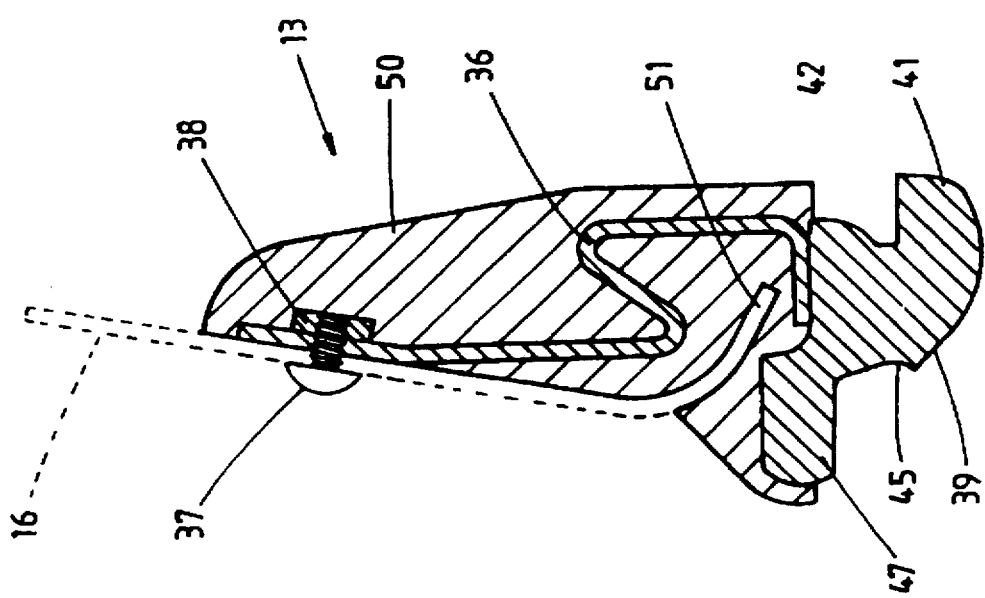

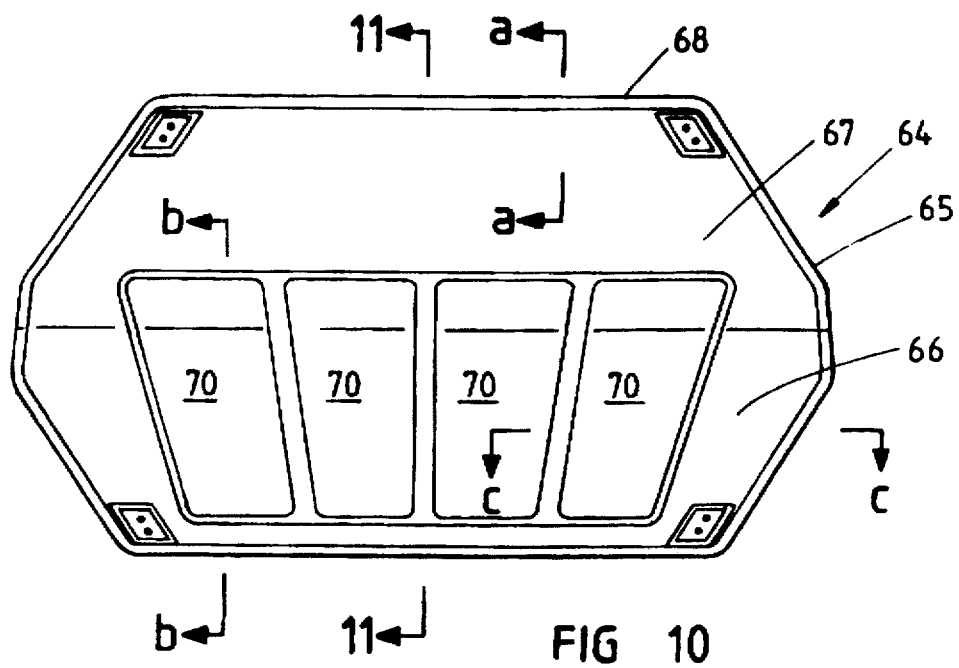
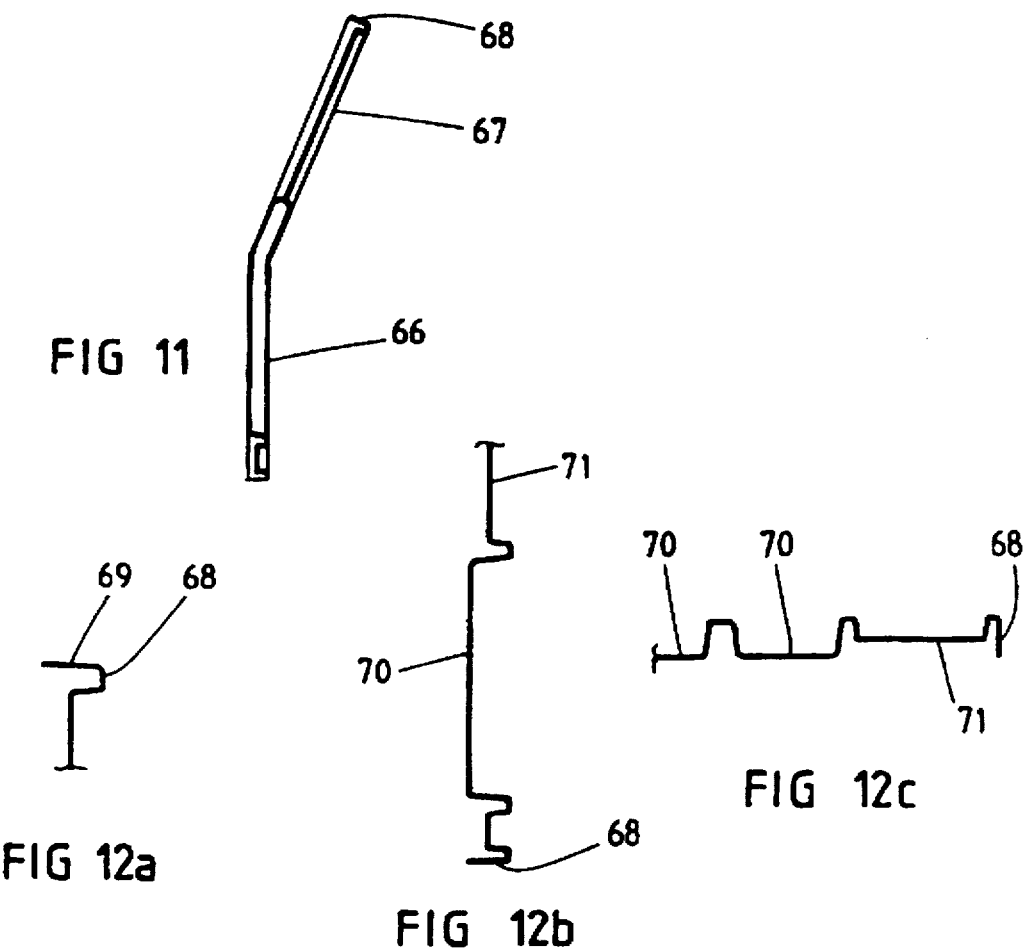

LUGGAGE SAFETY BARRIER

This invention relates to an improved safety screen or barrier for motor vehicles such as station wagons, vans and the like, and particularly relates to an improved motor vehicle safety screen which, when mounted within the vehicle, extends transversely from side to side and from the roof to the floor of the vehicle and against which any unrestrained forwardly moving loads can impact in a situation wherein the vehicle comes to a sudden halt or suddenly decelerates.

Safety screens or barriers for inhibiting the forward movement of an unrestrained load carried behind a driver or passenger in a motor vehicle are well-known to the applicant. In this regard reference is made to the applicant's earlier filed Australian Patent No. 583738 entitled "Vehicle Safety Screen Fixing Means" which discloses a safety screen assembly comprising a tubular metal peripheral frame to which is secured a heavy wire mesh infill panel, and a plurality of rearwardly extending rigid metal securing straps positioned one at or adjacent each corner of the screen, with each of the straps having its forward end pivotally attached to a bracket connected to the safety screen frame and its trailing or rear end securable to an anchorage point fixed with respect to the vehicle body. While the safety screen made in accordance with that invention has met with commercial success for a number of years, its construction does have a number of drawbacks. Firstly, the weight of the metal screen is quite significant and hence is heavy to handle and as well adds increased weight to the vehicle. Secondly, the metal mesh infill panel impairs, at least to some extent, the rearward view of the driver from the central interior rear vision mirror. Thirdly, where significant impact forces are impacted against the metal screen, the screen suffers permanent structural damage and cannot be reused and has to be discarded. Fourthly, the metal fabricated construction is not aesthetically pleasing, a factor which is likely to deter some people from installing such a barrier in their vehicle.

The applicant is also aware of U.S. Pat. No. 4,621,856 (McKenzie) which teaches the use of a demountable safety partition for motor vehicles and which comprises a rigid forwardly bowed panel made of transparent sheet polycarbonate, with the panel being removably fixed in position by means of elongate mounting brackets which extend along the upper and lower edges of the panel and which are fastened to anchorage plates secured in the roof and floor of the vehicle by means of fasteners. While the polycarbonate partition of McKenzie obviates at least some of the above-stated disadvantages associated with the safety screen disclosed in our earlier Australian Patent No. 583738; however, it is not without its practical problems. For example, the means by which the rigid sheet panel is mounted within the vehicle is quite inflexible and requires accurate alignment between the various mounting components for fastening the upper and lower edges of the screen to the roof and floor respectively of the vehicle. None of the mounting components have any ability to flex or twist during installation—it being appreciated that, a certain amount of "play" is of considerable benefit when securing the mounting componentry to their anchorage points. In addition, the mounting means of McKenzie do not have any load impact attenuating capability and hence where severe impact forces are imparted to the partition panel, significant forces will be transmitted to the anchorage points resulting in the panel being torn from its anchorage points. Still further, the polycarbonate panel of McKenzie is made from a flat sheet of polycarbonate material which is then shaped to form a number of flat panel portions offset to one another and essentially relies on two different factors for its ability to withstand impact loading, the first being the nature of the material from which the panel is made, ie polycarbonate, the second, being the bowed or arched configuration of the partition panel. No yieldability of the panel is disclosed or contemplated. Whilst these factors will allow the partition panel to provide adequate safety in situations where the energy of impact is not severe, they are unlikely to provide the necessary degree of protection where the impact forces are very severe eg a load in the order of 60 kgm moving at 60 kph, as would be required for the screen or barrier to pass existing safety standards applicable in Australia and elsewhere.

It is desirable therefore that both the partition panel and its mountings be designed to cushion and absorb the impact forces when a load is impacted against the screen during sudden deceleration of the vehicle, and thereby minimise the magnitude of the forces which are transmitted to the vehicle body anchorage points of the safety screen. It will be appreciated that if the impact energy imparted to the safety screen is not absorbed (and the mountings are sufficiently strong to withstand such forces) there is the further danger that the impacting load will violently rebound from the partition panel causing it to move rearwardly from the screen. However, in most situations, either the safety screen itself will fracture or shatter or one or more of its mounting points will be torn away from their anchorages which may be due in part to a "whip-lash" movement of the partition panel.

It is an object of the present invention to provide an improved motor vehicle screen or barrier which includes a partition panel designed to yieldingly resist severe impact forces imparted thereagainst by a forwardly moving load eg of up to 60–80 kgs moving at 60 km/h, in the vehicle, by absorbing at least some of the impact forces and thereby reduce the magnitude of forces being transmitted to the anchorage points of the screen.

It is another object of the present invention to provide an improved motor vehicle safety screen or barrier assembly wherein both the panel screen itself and its mountings are designed to absorb impact energy imparted to the screen, this being particularly desirable where severe or violent impact forces are involved.

It is a still further object of the present invention to provide an improved motor vehicle safety screen or barrier assembly which can be very quickly and easily installed within a vehicle, in more than one position if necessary, and in turn quickly and easily demounted.

It is a still further object of the present invention to provide a safety barrier or screen for a motor vehicle which can be produced at an acceptable manufacturing cost and which is far more aesthetically pleasing in comparison to known fabricated metal mesh structures.

A still further object of the present invention is to provide a safety barrier or screen for a motor vehicle which permits the driver of the vehicle to have a clear unobstructed rear view from the driving position of the vehicle.

In the specification and claims, the terms "rearward(ly)", "rear", "front" and "forward(ly)" are used with reference to the normal direction of travel of the vehicle in which the safety screen is fitted.

Broadly according to this invention therefore, a safety screen for a motor vehicle comprises a unitary formed, yieldable transparent panel of tough, impact resistant, thermoplastics material adapted to be mounted within the vehicle so as to extend transversely from side to side and from top to bottom of the vehicle so as to separate the load carrying area from occupants within the vehicle, said panel comprising at least one yieldable/deformable zone, arranged so that, when thus mounted within the vehicle, the panel is capable of deforming by eversion when an impact load impacts thereagainst, eg when the vehicle suddenly decelerates, and in so doing will absorb at least some of the impact energy imparted to the panel.

In one embodiment of the invention the main body of the panel is forwardly bowed or arched and is formed within a rearwardly directed peripheral flange extending around the perimeter thereof, arranged so that the forwardly bowed or arched panel body will evert to a rearwardly bowed configuration under high impact forces applied against the rear surface of the panel, with the peripheral flange being held securely to the inner walls of the vehicle during such impact. In this case, the whole of the panel body forms the yieldable zone.

Preferably, the bowed panel body comprises a forwardly tilted, planar upper panel portion and a rearwardly tilted, lower panel portion, the two portions being joined by a radius bend extending across the panel.

In a preferred arrangement, a plurality of forwardly opening pockets or recesses are formed across the width of the lower panel portion the pockets being spaced apart from one another and forming additional deformable zones which can deform by eversion when a load impacts thereagainst.

Preferably each said pocket comprises a recessed formation which protrudes rearwardly of the plane of the panel body.

Preferably said panel is made by thermoforming sheet polycarbonate material. Desirably, the panel is produced by a vacuum forming or injection moulding process. The panel may also be thermoformed as a laminate of plastics sheets.

In addition to facilitating the fixing of the panel to the inner walls of the vehicle, the rearwardly directed peripheral flange stiffens the outer edge region of the panel and thereby inhibits undesirable flexing or vibrational movement of the panel when the vehicle is moving.

It should of course be appreciated that the entire panel need not be transparent or translucent and that only the upper portion of the panel needs to be transparent from the point of view of driver vision.

It has been found from simulated road vehicle impact tests carried out by the applicant that a thermoformed polycarbonate screen produced in accordance with this invention will effectively slow down an unrestrained load, and inhibit its forward movement due to the yieldability of the body of the panel (or a portion thereof) by virtue of its ability to "turn inside out". In some instances, eg where the impact loading is not severe, the panel may return to its original profile once it is relieved of the stresses imparted to it during the impact. The extent to which the yieldable pockets are everted depends on the degree of localisation of the impact forces and, in some cases, the pocket may not completely evert. The deformable pockets assist to spread or distribute the impact forces over a greater area and in turn cushion the impact of the load.

Preferably the yieldable pockets are designed so that, after eversion, they can be pushed back into their original shape. In some instances, external pressure will be required in order to achieve this.

Polycarbonate is substantially unbreakable and shatterproof and is unlikely to suffer permanent structural damage. Of course, in instances where severe impact loading forces are applied, permanent damage may occur.

According to another aspect of the present invention, the protective barrier panel is installed within the vehicle by a plurality of attachment devices spaced around the periphery of the panel and which are arranged to releasably secure the upper and lower corner portions thereof to anchorage points in the roof and floor respectively of the vehicle, wherein at least some of said attachment devices comprise energy absorption means for absorbing some of the impact forces transmitted thereto when a load impacts against the panel.

Preferably the upper attachment devices for securing the upper end of the panel comprise a pair of upper rearwardly extending short length mounting straps positioned one at or adjacent each upper corner of the panel, each said strap having its leading end fixedly attached to the peripheral flange of the panel and its rear or trailing end secured by releasable fastening means, to an anchorage plate fixed in the roof of the vehicle. Preferably said releasable fastening means and said anchorage plate have complementary bayonet or keyhole type locking means.

Preferably, the lower attachment devices for releasably securing the lower end of the panel to the floor of the vehicle comprise a pair of depending hook-forming lugs connected to the panel at or near the lower corners thereof, each lug forming a rearwardly directed hook formation which is arranged to locate through a slotted opening in an anchorage plate secured to the vehicle floor and to releasably interlock the panel lower end to the floor. Alternatively, the anchorage plates can be securely fitted in the back-rest frame of the vehicle rear seat so that when the seat is in its folded down locked position (aligned with the luggage compartment floor), the anchorages can be engaged by the lugs. Each lug is connected to the panel body by means of a mounting strap or bracket arm which has its lower end rigidly fixed to the lug and its upper end fixedly attached to the panel.

Preferably, the mounting strap of each of said lower attachment devices has its upper end fastened to the front face of the panel, ie inboard of the peripheral flange thereof.

Preferably each of the mounting straps is provided with at least one transverse corrugation which enables the strap to stretch when a load impacts against the panel and thereby cushion the impact force.

Each of the mounting straps of the lower mounting devices may be embedded in a moulded elastomeric block or cover, the front face of said block or cover being provided with a forwardly opening cavity for receiving a portion of the peripheral flange extending along the bottom edge of the panel.

With the screen attachment devices of the present invention, the screen can be very easily and quickly installed by hookingly engaging the bottom fixing lugs in their respective anchorage plates in the vehicle floor, swinging the panel to an upright position so that the upper corners of the panel are in proximity to the roof anchorages, and thereafter engaging the upper quick release fastening devices with their respective anchorage plates fixed to the roof of the vehicle. The mounting of the lower portion of the panel can thus be carried out without the use of any fasteners, which of course significantly facilitates installation.

In order to more fully explain the present invention, several preferred embodiments thereof are described hereunder in some further detail with reference to the accompanying drawings in which:

FIGS. 1(a) and (b) are rear perspective and rear plan views of a safety screen assembly produced in accordance with a first embodiment of the present invention;

FIGS. 2 and 3(a) and (b) are vertical and horizontal cross-sectional views respectively taken through the undeformed panel shown in FIG. 1(b);

FIGS. 4(a)–(d) shows how the profile of the panel body progressively yields by eversion under high impact load;

FIG. 7 is a sectional view taken through one of the lower mounting devices which releasably secure the bottom opposite corner portions of the panel to the vehicle floor;

FIG. 8 is a perspective view of one of the lower mounting device and its associated anchorage plate which is fixed on the underside of the vehicle floor;

FIG. 10 is a front plan view of a moulded screen according to a third embodiment of the invention;

FIG. 11 is a sectional view taken along the lines 11—11 shown in FIG. 10; whilst FIGS. 12(a)–(c) are part sectional views taken along the lines A—A; B—B; and C—C respectively shown in FIG. 9.

Figure 1A:
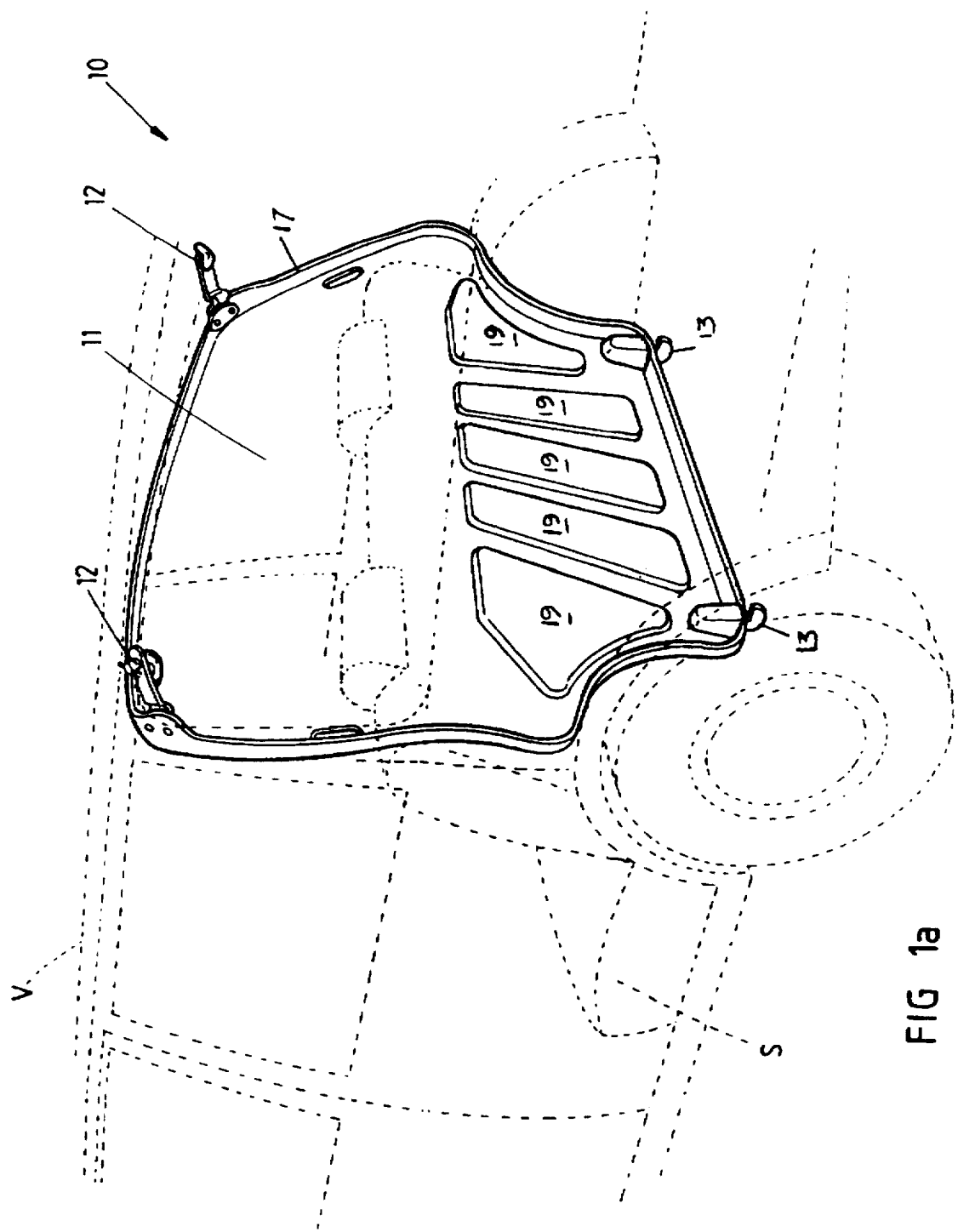
Figure 4A:
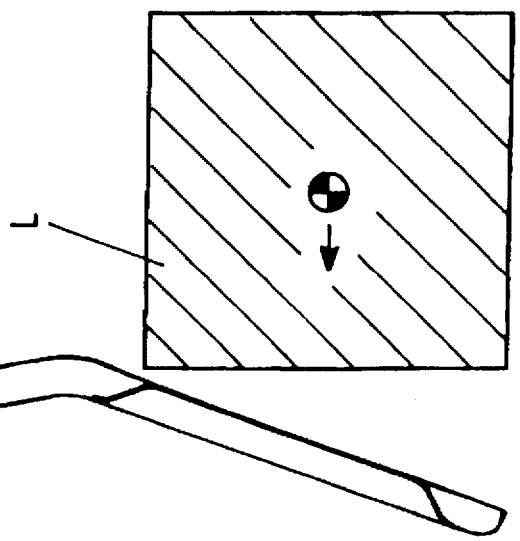
Figure 4B:
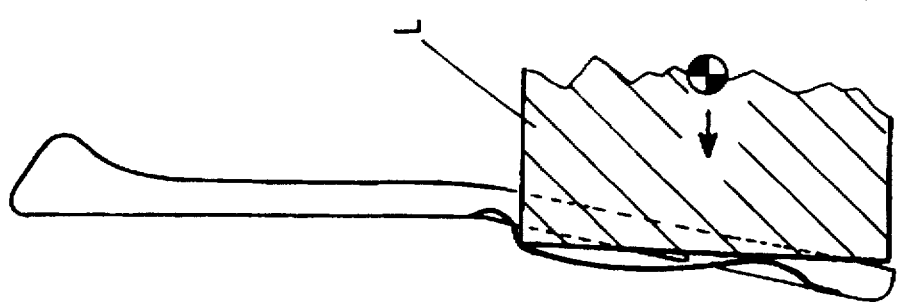
Figure 4C:
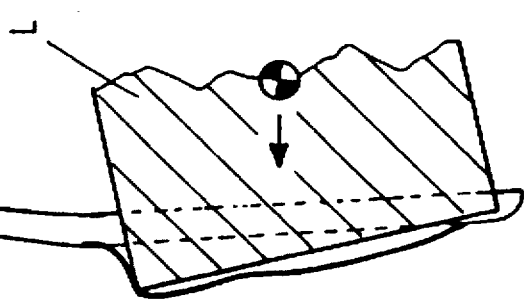
Figure 4D:
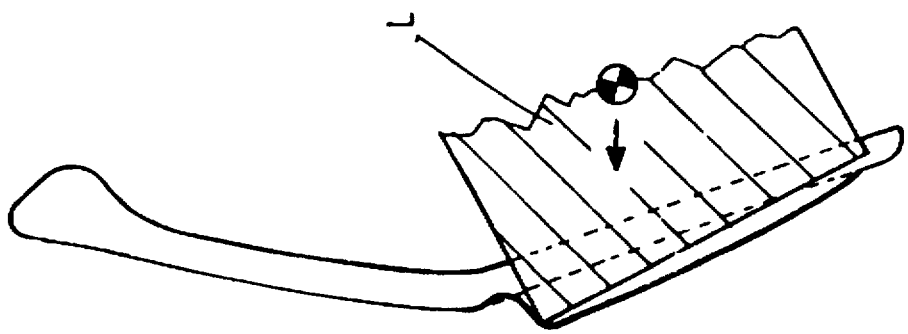

Referring to FIGS. 1 to 3 of the drawings, a safety screen assembly 10 is arranged to be mounted between the load carrying area of a vehicle 'V' and its rear passenger seat 'S' and comprises a partition panel 11 which extends transversely from side to side and from the roof to the floor of the vehicle, a pair of upper mounting devices 12 for releasably fixing the upper corners of the panel 11 to respective anchorage points in the vehicle roof, and a pair of lower mounting devices 13 for releasably attaching lower corner regions of the panel 11 to respective anchorage points in the floor of the vehicle.

In this embodiment the partition panel 11 is formed of sheet polycarbonate material by a vacuum forming process. Polycarbonate material is particularly advantageous on account of its extremely high impact strength and its transparency. Consequently the driver of a vehicle is able to have an unobstructed view from the central interior rear vision mirror of the vehicle, when the vehicle is being driven.

The integrally formed panel 11 is formed to have a slightly bowed or concave configuration and comprises a forwardly inclined planar upper panel portion 15 which connects through a radius bend 14 to a rearwardly inclined substantially planar lower panel portion 16. A rearwardly directed peripheral flange 17 extends continuously around the periphery of the panel 11. The flange 17 is designed to suitably stiffen the outer peripheral region of the panel 11 so as to avoid undesirable "shimmer" of the free edge portions of the panel when the vehicle is in motion, and to provide suitable attachment locations for the upper mounting devices 12.

The upper panel portion 15 has a central window area which is free of any surface impressions or irregularities which might impair the driver's vision therethrough.

The lower panel portion 16 is provided with a plurality of spaced apart polygonally shaped recessed portions or pockets 19 which are spaced across the width of the panel 11 and which protrude or project from its rear surface. The depth of the pockets 19 can vary. The pockets or recessed portions 19 serve a dual purpose in that they not only stiffen the construction of the lower panel portion 16 but they also function as yieldable zones which yield or deform when a forwardly moving impact load impacts thereagainst, which may occur when the vehicle comes to a sudden halt. The yieldable zones 19 (or at least portions thereof), when a concentrated impact load of sufficient magnitude impacts thereagainst, are everted (ie turn inside out), wholly or partly, and protrude from the front face of the panel portion 16, and in so doing absorb at least some of the impact energy which would otherwise be transmitted to the mounting devices 12, 13 and their respective anchorage points.

The eversion of the zones 19 may not impair the structural integrity of the panel 11 and in many instances, the deformed zones 19 can be returned to their original shape by applying pressure in the opposite direction. It has been found that in some instances, the zones 19, when in a deformed state, automatically "pop back" to their original shape upon release of the mounting devices 12, 13 from their anchorage points (which results in the panel 11 being released from its tensioned state).

It should be appreciated that the shape and configuration of the yieldable zones 19 may widely vary and that the panel may be formed with only a single zone which covers a major portion of the surface area of the panel 11.

It has also been found that by having an arched or bowed profile for the panel 11 with its flange 17 anchored firmly to the interior walls of the vehicle at each of its four corner regions a yieldable structure is achieved in that the panel 11 will, under impact of load L, deflect forwardly so that it tends to firstly straighten itself and then evert itself to a rearwardly bowed or convex profile, and in so doing absorb energy. This movement is shown in FIGS. 4(a) to (d) of the drawings, which also show the everting movement of one of the pockets 19.

Figure 5:
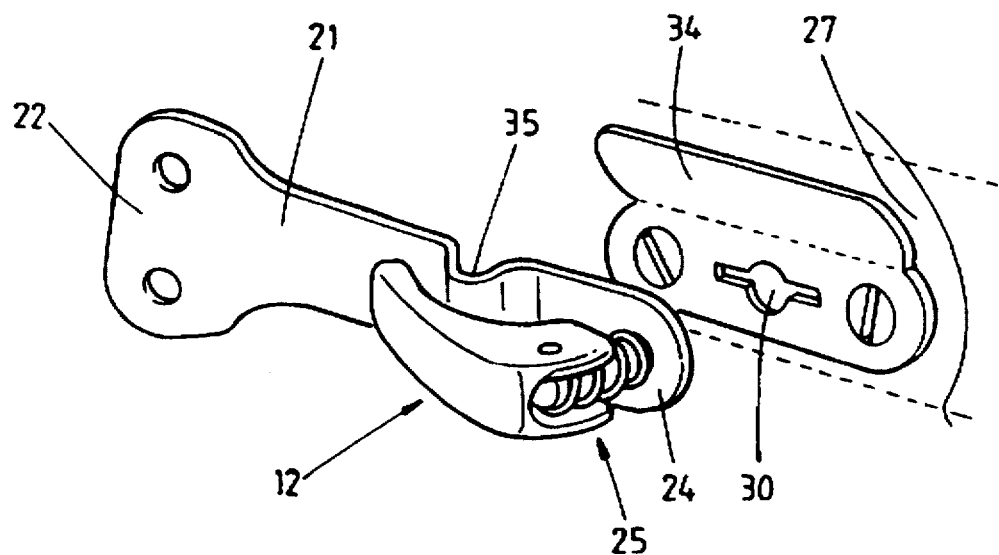
FIG. 5 is a perspective view of one of the upper mounting devices shown in FIG. 1(a) for releasably fixing an upper corner region of the panel to the vehicle roof.
Figure 6:
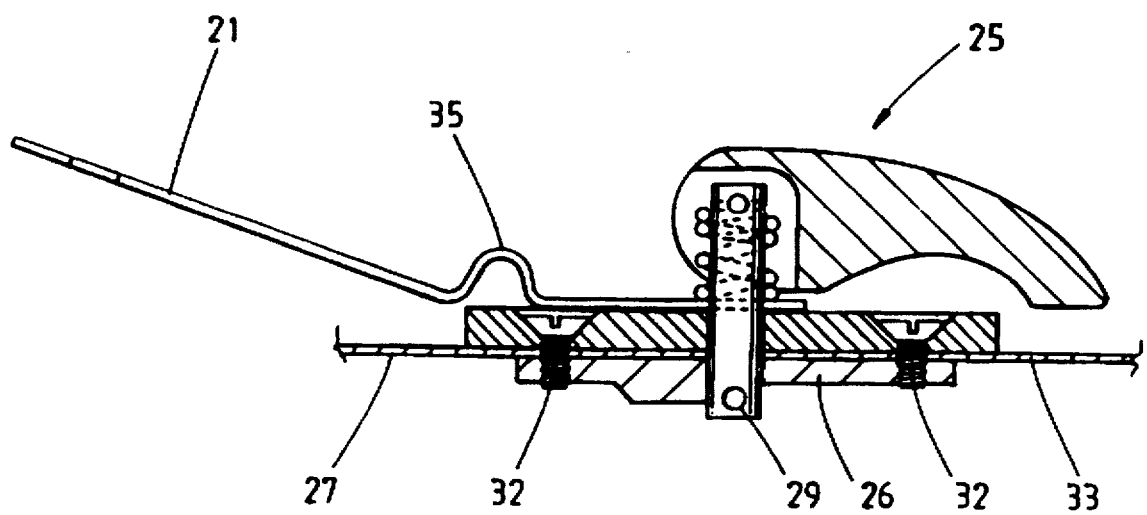
FIG. 6 is a sectional view of the mounting device shown in FIG. 5, when in its locked position with an anchorage plate in the vehicle roof.

Referring now to FIGS. 5 and 6 of the drawings, each of the mounting devices 12 comprises a rearwardly extending short length metal strap 21 which is secured at its inner or leading end 22, by means of rivets 23 or any other suitable fasteners, to the flange 17 of the panel 11 at an upper corner thereof, its trailing end being releasably fixed by means of a spring loaded bayonet type locking device 25 to an anchorage plate 26 fixed to the opposite side of the vehicle roof panel 27. The locking device 25 is of the quick-release type and comprises a bayonet type spring loaded locking pin 29 which co-operates with a complementary shaped bayonet opening 30 formed in the anchorage plate 26.

In this embodiment, each of the anchorage plates 26 is secured to the vehicle cantrail 27 by means of fixing screws 32, the screws 32 passing through a cover plate 33 which overlies the anchorage plate 26 on the other side of the cantrail 27. The cover plate 33 is provided with a hinged flap 34 which, when closed, conceals the anchorage point from view (when not in use).

As shown in FIGS. 5 and 6, each of the mounting straps 21 is provided with a transverse wrinkle or corrugation 35 intermediate the ends thereof, which permits the strap to stretch as the panel 11 moves forwardly under the influence of an impact force, and in so doing absorbs at least some of the impact force when the load impacts against the screen. Again this energy absorption feature reduces the magnitude of the forces which are transmitted to the anchorage points of the panel 11. The ability of the straps 21 to allow the panel 11 to undergo limited forward movement under impact load assists the eversion of the panel 11 in that the panel is able to "spread" as it is flattened by the load prior to turning itself "inside-out".

The locking device 25 is rotatably mounted at the trailing end of the strap 22, and has its locking pin 29 passing through a hole formed in the end of the strap. In order to disengage the pin 29, the handle 25' of the device 25 is lifted outwards and rotated, which causes the pin 29 to retract under the bias of spring 24.

The pair of lower mounting devices 13 are shown in FIGS. 7 and 8 of the drawings, each of the devices 13 comprising a profiled mounting strap 36 formed of steel plate which is fixed at its upper end, by means of a bolt 37 and nut 38 to the lower panel portion 16 of the panel 11, and at its lower end, by weld means, to a fixing lug 39 which is arranged to releasably interlock with anchorage plate 40 fixed to the underside of the vehicle floor panel (not shown). The fixing lug 39 is formed to have a rearwardly projecting hook formation 41 which provides a hook recess 42. The lug 39 is arranged to be inserted through the slotted opening 43 in the anchorage plate 40, with the hook 41 engaging against the underside of the plate 40 in order to lockingly retain the device 13 in position. Preferably a flat wire retention spring 46 is located between the plate 40 and the vehicle floor around one of the fixing screws for the plate 40, and makes pressure contact against a lip 45 on the front edge of the lug 39 to firmly retain the lug 39 in its locked position.

The lug 39 is also provided with a forwardly projecting finger 47 which, when the device is hooked into engagement with anchorage plate 40 bears against the upper surface of the floor panel and functions to restrain rotation of the lug 39 in an anticlockwise direction.

The steel fixing strap 36 is formed with a pair of transverse folds 48, 49 which are designed so that the strap 36, under load, will elongate and in turn allow the panel to move forwardly when a load impacts thereagainst. This again is designed to cushion the impact and effectively absorb some of the impact energy imparted to the panel 11. Again, the ability of the straps 36 to allow the lower portion of the panel to undergo limited forward movement under impact load facilitates the everting movement of the panel.

As shown in FIG. 7 of the drawings, each of the fixing straps 36 is, in this embodiment, embedded in a block 50 of elastomeric material, eg polyurethane, which not only assists impact energy absorption but also improves the aesthetic appearance of the lower mounting devices. The block 50 is formed with a slot in its front face to receive the bottom flange portion 51 of the flange 17 of the panel 11.

The installation of the safety screen 10 is extremely simple and one simply hooks the lower mounting devices 13 within their respective anchorage plates 40 of the vehicle (with the panel 11 in a tilted condition) and thereafter swings the panel upwardly so as to place the upper mounting devices 12 with their locking devices 25 in proximity to their anchorage plates 26 mounted in the roof of the vehicle. The handles of the locking devices 25 are then manipulated so as to insert the locking pins 29 through their respective openings 30 in the plates 26 and rotated so as to releasably lock the two together. No further steps are required. The mounting devices 12, 13 thereby enable the screen to be very quickly and readily mounted and demounted.

Figure 9:
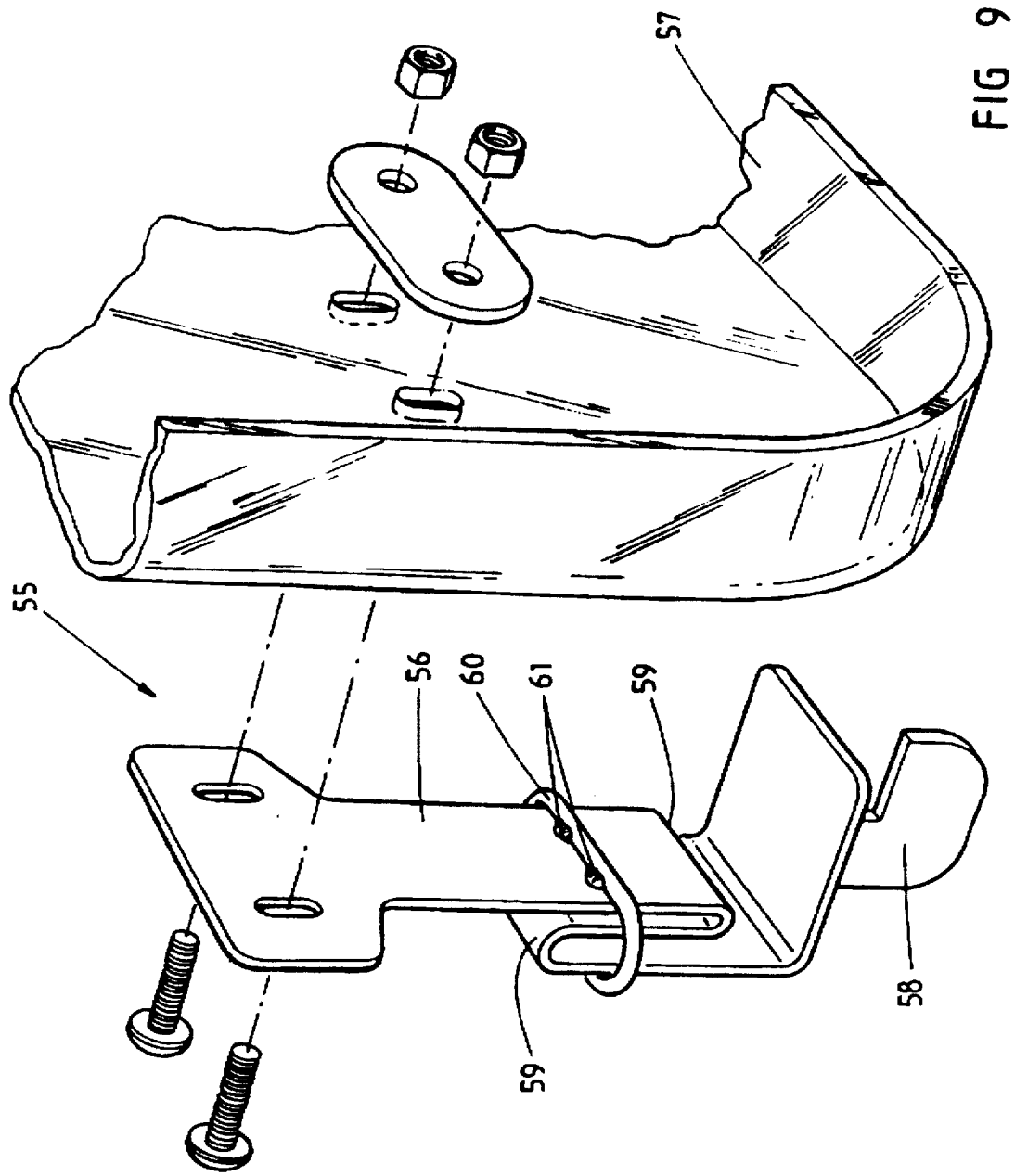
FIG. 9 is a fragmentary, "exploded" perspective view showing one of the lower mounting devices and the manner of its securement to the bottom portion of the screen, according to a second embodiment of the invention.

In the embodiment of the invention shown in FIG. 9, each of the lower screen mounting devices 55 comprises a metal fixing strap 56 which is fixedly secured at one of its ends to the front face of the panel 57 adjacent a bottom corner thereof, the other end of the strap 56 having a hook-forming lug 58 fast therewith, the lug 58 being arranged to releasably interlock with an anchorage plate in the floor in a manner similar to that shown in FIG. 7. The strap 56 is formed with transverse folds 59 which allow the strap 56 to elongate under load. To further assist the absorption of impact energy, a steel oval-shaped loop 60 is tightly fitted around a portion of the strap 56 (which contains the folds) and is secured on one of its sides only to the strap 56 by weld means 61. The loop 60 functions to constrain the elongation of the strap 56.

It should be appreciated that other types of mounting devices for fixing the panel 11 into position can be used. For example, each of the lower mounting blocks 13 can be replaced by a mounting strap and locking device similar to upper mounting devices 12. It should also be appreciated that more than four mounting devices spaced around the periphery of the panel 11 can be employed. It is desirable however that each of the mounting devices has an energy absorbing capacity and that they allow limited bodily forward movement of the panel under impact load.

In the embodiment shown in FIGS. 10 to 12 of the drawings, a safety screen 64 comprises a thermoformed panel 65 shaped to have substantially upright transversely extending lower half 66 and a forwardly inclined or offset transversely extending upper half 67. A peripheral stiffening flange 68 of channel section extends around the perimeter of the panel 65, with the channel opening rearwardly and its outer limb 69 being splayed outwardly. The panel 65 is once again vacuum formed (under heat) from a sheet of polycarbonate material. It may however be injection moulded.

A series of side-by-side recessed formations or pockets 70 are formed in the body 71 of the panel 65 and extend from the lower half 66 into the upper half 67 of the panel 65. The pockets 70 serve to stiffen the panel and also absorb impact energy through their ability to "turn inside out" when a load impacts thereagainst.

The panel 65 is secured within the vehicle by means of the mounting strap devices shown in FIGS. 5 & 6 and FIGS. 7 & 8 or FIG. 9 of the drawings.

In a further non-illustrated embodiment of the invention, the transverse panel 11, 65 can be shaped so that its profile in transverse horizontal section is concavely curved rather than as offset substantially planar upper and lower segments.

Tests carried out by the Applicant have shown that panels which do not include the deformable pockets in their bottom region tend to stretch or permanently deform to a slightly larger extent than those having the pockets when subjected to the same impact crash conditions. Furthermore, without the pockets, the securing straps, in particular the lower ones, appeared to elongate more than the straps which were used with a panel having the pockets. The pockets are believed therefore to play a significant role in reducing the severity of the impact forces transmitted to the securing devices and their anchorages, as well as the effect of those forces measured in terms of the overall deformation (ie extent of eversion) of the body of the panel.

A brief consideration of the abovedescribed embodiments will indicate that the invention provides an improved safety screen or barrier for a motor vehicle which has vastly improved energy absorption capabilities enabling it to significantly alleviate the shock forces transmitted to the anchorage points of the screen, and one which can quickly and readily be installed within the vehicle. In addition the panel, being formed of clear and transparent material, provides a clear and unobstructed view rearwards therethrough and its appearance is far more aesthetically pleasing in comparison to well-known barriers which employ metal mesh panels.

The claims defining the invention are as follows:

1. A safety screen for a motor vehicle comprising a unitary formed, yieldable panel of tough impact resistant transparent thermoplastics material, adapted to be mounted within a motor vehicle so as to extend transversely from side to side and from top to bottom of the vehicle so as to separate the loading carrying area from occupants within the vehicle, said panel being shaped and configured so that when thus mounted within the vehicle, the body of the panel or a portion thereof is capable of deforming by eversion when an impact load impacts thereagainst, and in so doing absorb at least some of the impact energy imparted to the panel.

2. A safety screen according to claim 1 wherein said panel comprises a plurality of forwardly opening recess-forming pockets spaced across the width of said panel, each said pocket constituting a yieldable/deformable zone which can deform by eversion when a load impacts thereagainst.

3. A safety screen according to claim 1 wherein said yieldable panel has a forwardly bowed or arched profile in vertical section and is provided with a rearwardly directed peripheral flange extending around its perimeter.

4. A safety screen according to claim 3 wherein said panel comprises a forwardly tilted planar upper panel portion and a rearwardly tilted lower panel portion, said portions being joined by a radius bend extending across the panel.

5. A safety screen according to claim 4 wherein said yieldable pockets are formed in said lower panel portion.

6. A safety screen according to claim 5 wherein each said pocket comprises a recessed formation which protrudes rearwardly of the plane of the lower panel portion.

7. A safety screen according to claim 1 wherein said panel is produced by vacuum forming polycarbonate sheet material.

8. A safety screen according to claim 3 further comprising a plurality of securing devices spaced around the periphery of said panel and arranged to releasably secure the upper and lower corner regions of the panel to anchorage points in the roof and floor respectively of the vehicle, said securing devices for securing the opposite upper corner portions of the panel comprising a pair of upper rearwardly extending short length mounting straps positioned one at or adjacent each upper corner of the panel, each said strap having its leading end fixedly attached to the peripheral flange of the panel and its rear or trailing end secured by releasable fastening means to an anchorage plate fixed in the roof of the vehicle.

9. A safety screen according to claim 8 wherein said releasable fastening means is of the quick release type.

10. A safety screen according to claim 9 wherein each said fastening means comprises a spring-loaded bayonet type locking pin which co-operates with a complementary shaped opening in said anchorage plate.

11. A safety screen according to claim 8 wherein said lower securing devices for securing the bottom corner portions of the panel comprise a pair of depending mounting straps which have their upper ends fixedly secured to the panel near the opposite lower corners thereof and a pair of bottom locating lugs fixedly secured to the lower ends of said depending mounting straps and being spaced below the bottom edge of the panel, each said lug being formed with a rearwardly directed hook formation which is arranged to interlock with a slotted opening in an anchorage plate secured to the vehicle floor.

12. A safety screen according to claim 11 wherein each said mounting strap of each of said lower securing devices has its upper end fastened to the front face of the body of the panel.

13. A safety screen assembly for a motor vehicle comprising a protective panel adapted to be mounted within the vehicle so as to extend transversely from side to side and from top to bottom of the vehicle so as to separate the load carrying area from the occupants within the vehicle, side panel being provided with a rearwardly directed peripheral flange extending around its perimeter, and mounting means spaced around the periphery of the panel arranged to releasably secure top and bottom portions of the panel to anchorage points in the roof and floor respectively of the vehicle, said mounting means comprising (i) a pair of upper rearwardly extending short length mounting straps positioned one at or adjacent each upper corner of the panel, each said upper mounting strap, having its leading end fixedly attached to said flange and its rear or trailing end secured by releasable fastening means to an anchorage plate fixed in the roof of the vehicle, and (ii) a pair of bottom locating lugs rigidly attached to the panel one at or near each bottom corner of the panel, each said lug comprising a hook formation which, when the screen is installed within the vehicle, releasably interlocks with an anchorage plate fixed with respect to the vehicle floor.

14. A safety screen assembly for a motor vehicle comprising a protective panel adapted to be mounted within the vehicle so as to extend transversely from side to side and from top to bottom of the vehicle so as to separate the load carrying area from the occupants within the vehicle, and mounting means spaced around the periphery of the panel arranged to releasably secure top and bottom portions of the panel to anchorage points in the roof and floor respectively of the vehicle, said mounting means comprising (i) a pair of upper rearwardly extending short length mounting straps positioned one at or adjacent each upper corner of the panel, each said strap having its leading end fixedly attached to said panel and its rear or trailing end secured by releasable fastening means to an anchorage plate fixed in the roof of the vehicle, and (ii) a pair of bottom mounting straps one at or near each bottom corner of the panel, each said bottom mounting strap having an upper end fixedly attached to the body of the panel and being provided with a rigid locating lug at its lower end thereof, each said lug comprising a hook formation which, when the screen is installed within the vehicle, releasably interlocks with an anchorage plate fixed with respect to the vehicle floor.

15. A safety screen assembly according to claim 14 wherein each said mounting strap is provided with at least one transverse corrugation which enables the strap to stretch when a load impacts against the panel and thereby cushion the impact force.

16. A safety screen assembly according to claim 13 or claim 14 wherein said hook formation on each said lug is rearwardly directed.

17. A safety screen assembly according to claim 13 or claim 14 wherein said panel is vacuum formed from tough impact resistant thermoplastic sheet material.

18. A demountable safety screen assembly for a motor vehicle comprising:
 a panel adapted to be mounted within a vehicle so as to extend transversely from side to side and from top to bottom of the vehicle so as to separate the load carrying area from the occupants within the vehicle,
 a pair of upper fixing members secured to said panel, one at or adjacent each upper corner thereof, said fixing members co-operating with respective anchorage means mounted in the roof of the vehicle for releasably securing the upper corner portions of the panel within the vehicle,
 a pair of bottom fixing members fixed to and depending from the bottom edge of the panel, one at or adjacent each bottom corner thereof, each said bottom fixing member having means to hookingly engage a respective anchorage mounting fixed to or with respect to the floor of the vehicle, whereby the panel can be mounted within the vehicle by firstly hookingly engaging the bottom fixing members in their anchorage mountings in the vehicle floor, swinging the panel upwardly to a substantially upright operative position and thereafter securing the upper fixing members to their respective anchorage means in the roof of the vehicle.

19. A demountable safety screen assembly according to claim 18 wherein each said upper fixing member comprises a rearwardly extending short length metal mounting strap and a quick release connector carried at its rear or trailing end.

20. A demountable safety screen assembly according to either claim 18 or claim 19 wherein each said bottom fixing member comprises a depending mounting strap which has its upper end fixedly attached to the body of the panel and its lower end rigidly fixed to a respective hook-forming lug which is arranged to interlock with a locating aperture in its associated said anchorage mounting.

21. A demountable safety screen assembly according to claim 20 wherein said hook forming lug comprises a rearwardly directed hook formation.

22. A demountable safety screen assembly according to claim 18 wherein said panel is forwardly bowed or arched and is formed with a rearwardly directed peripheral flange extending around the periphery thereof.

23. A unitary thermo-formed protective panel adapted to be mounted within a motor vehicle so as to extend transversely from side to side and from top to bottom of the vehicle so as to separate the load carrying area from the occupants within the vehicle, wherein:

i) the panel is comprised of tough, impact resistant, deformable thermo-plastics sheet material;

ii) a rearwardly directed flange extends around the periphery of the panel;

iii) the body of the panel is adapted to yield by eversion, when a severe impact force is imparted to the panel.

24. A unitary formed protective panel according to claim 23 wherein the body of the panel is forwardly bowed or arched.

25. A unitary formed protective panel according to claim 23 or 24 wherein the body of the panel has formed in its lower region a plurality of forwardly opening recessed zones spaced across the width of the panel each said zone being capable of being deformed by eversion under impact.

* * * * *

UNITED STATES PATENT AND TRADEMARK OFFICE
CERTIFICATE OF CORRECTION

PATENT NO. : 5,735,564
DATED : 4/7/98
INVENTOR(S) : JAMES DEANE COOGAN

It is certified that error appears in the above-indentified patent and that said Letters Patent is hereby corrected as shown below:

- COLUM 9, CLAIM 13, LINE 60: delete "side" and insert --said-- instead; and

- ADD CLAIM 31 (omitted) which reads:

"31. A unitary thermo-formed protective panel according to claim 28 further comprising a pair of spaced apart hook formations secured by rigid attachment means to said panel for reasonably securing the lower corner regions of the panel to the floor of the vehicle, each said hook formation being adapted to interlock with a respective anchorage plate fixed with respect to the vehicle floor."

Signed and Sealed this

Fifteenth Day of September, 1998

Attest:

BRUCE LEHMAN

Attesting Officer

Commissioner of Patents and Trademarks